Figure 1:
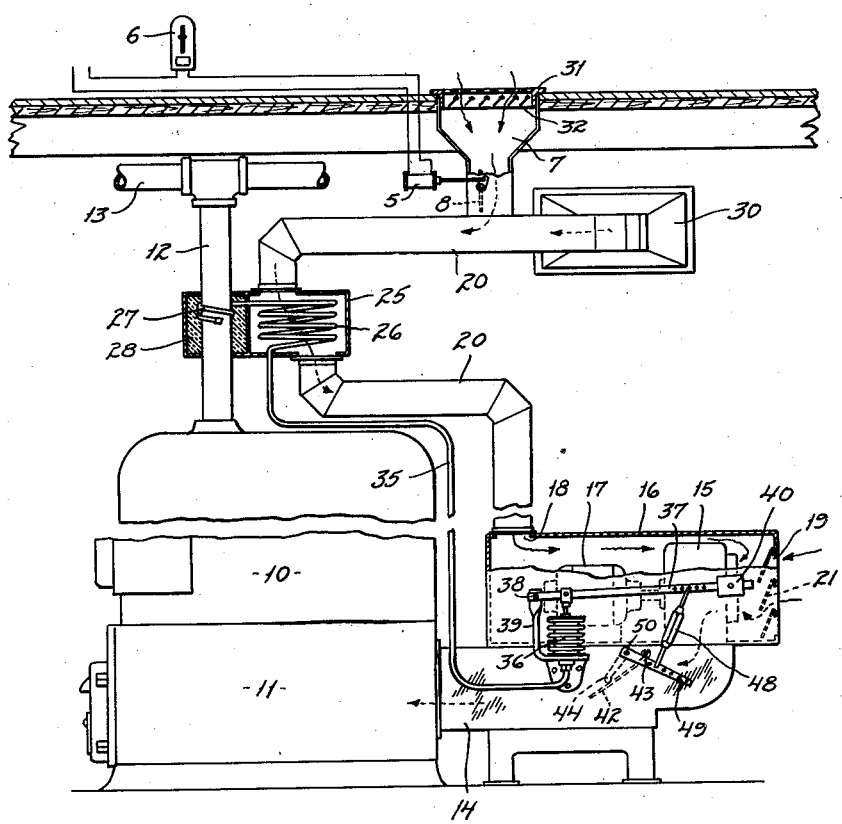

July 4, 1939.  J. C. MILES  2,164,882
METHOD AND MEANS FOR CONTROLLING THE OPERATION OF A FURNACE
Filed Dec. 2, 1935  2 Sheets-Sheet 1

INVENTOR.
JAMES C. MILES
BY
Bates, Golrick, & Teare
ATTORNEYS

July 4, 1939.　　　　　J. C. MILES　　　　　2,164,882
METHOD AND MEANS FOR CONTROLLING THE OPERATION OF A FURNACE Filed Dec. 2, 1935　　　2 Sheets-Sheet 2

| Outside Temp. | 70° | 60° | 50° | 40° | 30° | 20° | 10° | 0° |
|---|---|---|---|---|---|---|---|---|
| B.T.U. Loss | 0 | 10,000 | 20,000 | 30,000 | 40,000 | 50,000 | 60,000 | 70,000 |
| Lbs. Coal | 0 | 1.5 | 3.0 | 4.5 | 6.0 | 7.5 | 9.0 | 10.5 |
| Lbs. Air | 0 | 26 | 52 | 78 | 104 | 130 | 156 | 182 |

INVENTOR.
JAMES C. MILES
BY
Bates, Golrick, & Teare
ATTORNEYS

Patented July 4, 1939

2,164,882

UNITED STATES PATENT OFFICE 2,164,882

METHOD AND MEANS FOR CONTROLLING THE OPERATION OF A FURNACE

James C. Miles, Cleveland Heights, Ohio

Application December 2, 1935, Serial No. 52,488

11 Claims. (Cl. 236—9)

This invention relates to heating apparatus and particularly to forced draft appliances that are used for controlling the combustion of fuel in a furnace. Forced draft units usually include a motor and a fan together with control apparatus for automatically cutting off the motor circuit whenever the room temperature reaches the desired degree or whenever the furnace temperature reaches a degree that is regarded as unsatisfactory for safe operation.

In Letters Patent of the United States No. 1,989,105 which were issued to me January 29, 1935, there is illustrated a draft regulator, which overcomes the objection incident to the intermittent operation of the fan, but the operation of the motor is controlled by variations in temperature in the room to be heated, while the quantity of air admitted is controlled by the temperature or pressure of the heating medium. Furnaces that are controlled by variations in the room temperature usually show a zigzag line in the room temperature chart because the room must become cold before the temperature control apparatus is operated to increase the combustion in the furnace, and thereafter the combustion is diminished when the room reaches the correct temperature. However, the heat generated by the increased combustion usually makes the room too warm and consequently every room temperature chart usually has a zig-zag form.

The optimum condition in the operation of any furnace is to maintain a straight line in the room temperature chart, but heretofore it has been impossible to attain such condition because the room temperature may not vary until the outside temperature has varied a considerable extent. For example, when the room is heated to a certain degree for a predetermined length of time, the building insulation will retain the heat even though the outside temperature may have dropped to a considerable extent. Accordingly, whenever the demand for heat arises, the lowered outside temperature will have cooled the room to such extent that a relatively long period of time is required before the combustion can be increased sufficiently to raise the room temperature.

An object of my invention is to provide a control apparatus, which when once adjusted to a building, having a known heat loss at a desired room temperature, will automatically regulate the combustion in accordance with the changes in the outside temperature so as to maintain a constant room temperature. This arrangement maintains a maximum operating efficiency of the furnace with a minimum degree of attention by the operator.

An additional object of my invention is to so construct the furnace room air inlet damper that when a minimum quantity of air is being forced into the furnace, the damper is normally closed, wherefore substantially all of the air that is fed into the furnace is taken from outside the building. In this way, the furnace control member is constantly subjected to the outside temperature, and is therefore, quickly responsive to sudden changes in the outside temperature, long before the room temperature would be affected by such change. In this connection, the damper is so constructed, that as the intake volume is increased, the damper is opened automatically to increase the proportion of air admitted from the furnace room. Thus, the outside air is constantly flowing into the furnace, but as the quantity is increased, the inside air is added, so as to maintain a substantially uniform velocity through the fire box.

Figure 2:
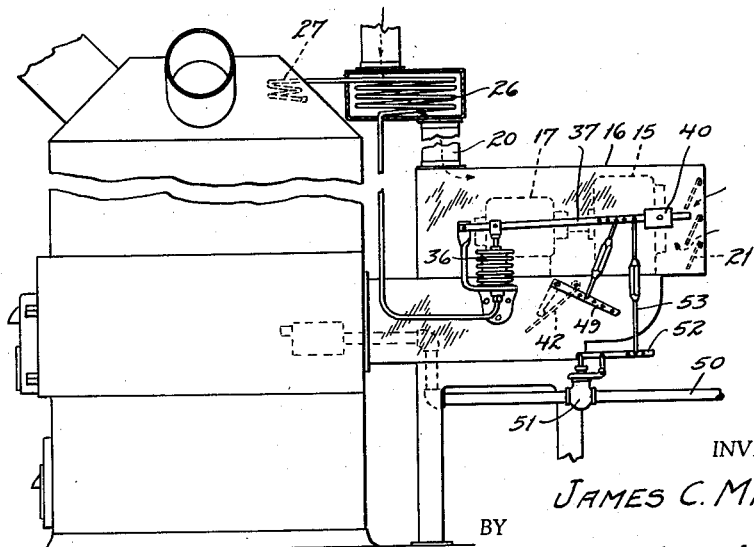
Figure 3:
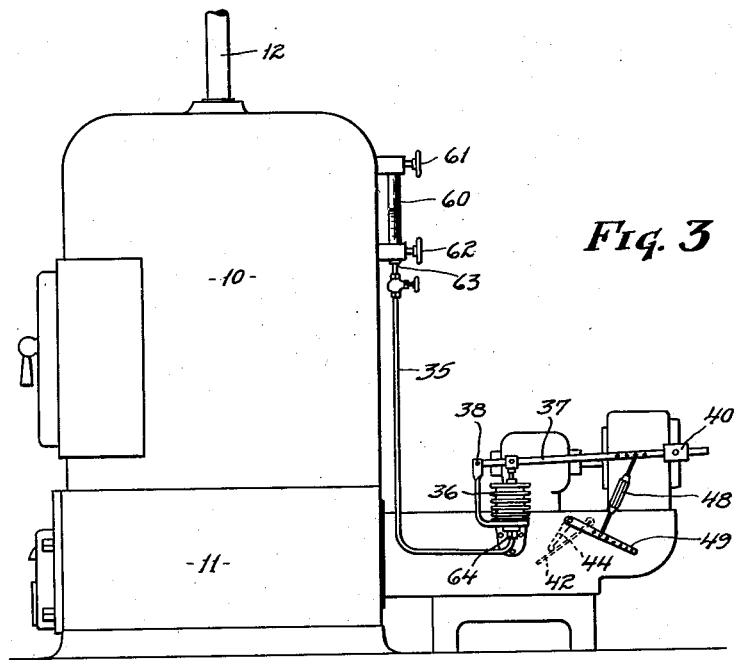
Figure 4:
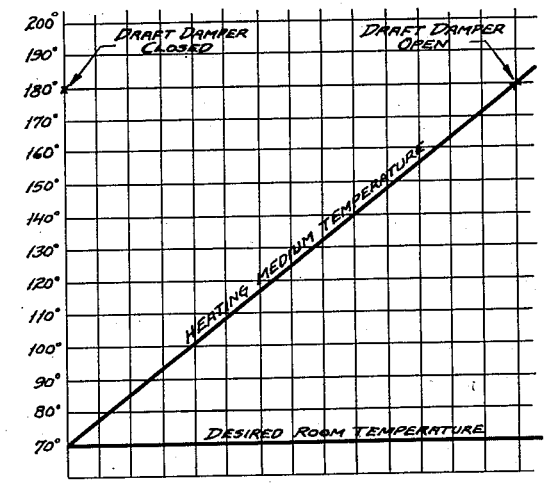
Figure 5:
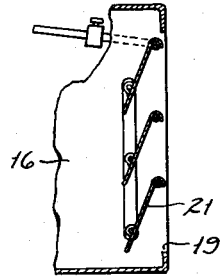

Referring now to the drawings, Fig. 1 is a side elevation of a coal burning furnace that is equipped with my invention; Fig. 2 is a fragmentary view of the apparatus as applied to an oil or gas fired furnace; Fig. 3 is a side view of a steam boiler that is equipped with a modified arrangement for controlling the flow of air to the combustion chamber in the furnace; Fig. 4 is a chart indicating the optimum in connection with the operation of a furnace, and Fig. 5 is an enlarged sectional view of the damper.

Referring now to Fig. 1, I have indicated a coal burning furnace of a hot water boiler at 10, which has an ash pit 11, and a riser 12 which leads to a header 13. The air for supporting combustion is conducted beneath the grate into an ash pit through a conduit 14 and flow maintained by means of a fan 15, which is shown within a casing 16 and is adapted to be operated by electric motor 17. In accordance with my invention, the motor is continuously operated at constant speed, and is also located within the casing 16. Openings for the admission of air to the casing are indicated at 18 and 19 respectively, the first of which admits air from the conduit 20, and the second of which admits air to the furnace from the boiler room. A damper 21 adjacent the opening 19 controls the volume of air entering from the boiler room. The conduit 20 includes a chamber 25, which is larger in cross sectional area than portions of the conduit which lead to and from the chamber, and which is adapted to house the coil 26 of tubing that contains an expansible fluid. One terminal of the coil is wrapped around the hot washer riser 12, as shown in 27, and is preferably insulated from the remaining part of the chamber by suitable heat insulating material 28. Thus, the fluid in the coil 27 is subjected to the heating medium while that in the coil 26 is subjected to the incoming air. Consequently, the resulting temperature, or pressure of the fluid is a definite and fixed amount for a given temperature of the heating medium and a given temperature of the incoming air. The control apparatus, which will hereafter be described, is then adjusted so as to admit a definite quantity of air into the combustion chamber to correspond with the furnace demand at the designated pressure of the expansible fluid.

The conduit 20 is shown as having one entrance 30, which is disposed in the wall of the building for taking in air from a point outside the building, and as having another entrance 31 for taking in air from the room that is to be heated. A set of louvers 32 may be positioned adjacent the opening 31 for selectively controlling the degree of opening in the room inlet.

The conduit for expansible fluid is shown at 35, as extending downwardly and as being connected at its lower end to a collapsible bellows 36, which is illustrated as being mounted outside the casing 16 and as being adapted to operate a lever 37 which is pivotally mounted at 38 upon a stationary arm 39. A weight 40 is adapted to be adjustably positioned upon the lever for regulating the resistance to the movement of it by the collapsible bellows. The motion of the lever is utilized for controlling the motion of a damper 42, which is pivoted at 43 to swing across the intake conduit 14. An incoming current of air normally tends to swing the damper to the open position, but such air movement is resisted by an arm 44, which is disposed within the conduit 14 and is adapted to engage the furnace side of the damper and to be moved in accordance with the movements of the lever 37. The connection to the lever may be made by a link 48, which extends between the lever and an arm 49, the latter being rigidly connected to a rock shaft 50 on which the arm 44 is rigidly mounted. In Fig. 1, the damper is shown in open position.

To maintain a constantly moving current of outside air through the coil box 25, so as to take advantage of variations in the temperature of the outside air, as soon as they occur, I prefer to utilize a balanced damper for the opening 19, which controls the admission of inside air. The damper, as shown, may comprise a series of louvers, which are so balanced that normally they close the opening so long as a minimum quantity of air is flowing into the furnace. The adjustment is such however, that as the quantity of air is increased (due to the opening of the damper 42) the damper 21 is automatically opened so as to admit a quantity of inside air, and to intermingle it with the outside air that is passing into the furnace. The net result of the balanced damper is to maintain a substantially uniform velocity through the coil box 25. The automatic operation of the damper may be controlled by the size of a weight which acts normally to hold the louvers closed so long as the minimum quantity of air is flowing into the furnace.

The operation of my draft regulator can best be understood by reference to a graph, which is shown in Fig. 4 in which the ordinates represent the outside temperature as varying from 70 degrees to zero, while the absiccas represent the temperature of the heating medium, as applied to a hot water system for a building having a known heat loss. The building, which is presented by the chart has a loss of 70,000 B. t. u. per hour at an outside temperature of zero degrees and a desired room temperature of 70 degrees. Such loss diminishes in arithmetical progression until the temperature reaches 70 degrees, expressed for ten degree variations in the line designated B. t. u. loss. Assuming that coal having a heat value of 12,700 B. t. u. per lb. is used for fuel and assuming a furnace efficiency of 53%, then the fuel required will be 10.5 lbs. of coal per hour to maintain a loss of 70,000 heat units. This is obtained by the following formula: $X \times 12,700 \times .53 = 70,000$ And to burn 10½ pounds of coal, the air required for supporting combustion would be 182 pounds per hour, and this in turn would maintain the water in the regulator at 180 deg.

So long as the outside temperature remains zero and the room temperature remains 70 it is only necessary to maintain a constant fuel supply and a constant air supply, but the changing conditions of the weather would immediately upset such balance, because if the outside temperature increased—say 10 deg., and the water temperature remained 180, the room temperature would be increased. Accordingly in order to maintain a constant room temperature, it is necessary to diminish the water temperature to approximately 165 deg. for at 10 deg. above zero, the heat loss is only 60,000 B. t. u. Under such conditions, it is only necessary to burn 9 lbs. of coal and to supply 156 lbs. of air per hour.

My invention when using coal, as a source of fuel contemplates the use of the fire pot as a magazine or hopper which can be loaded with fuel to its capacity, so that the rate of combustion may be controlled merely by controlling the quantity of air admitted. Accordingly, as the blower is constantly in operation a small quantity of air is allowed to move at all times past the damper so that the outside temperature is immediately reflected in the temperature of the incoming air. This, in turn, affects the resulting pressure of the expansible fluid and through the medium of the mechanism that is operated by the bellows, automatically changes the combustion in the furnace by admitting more or less air as conditions require. I have found, after the position of the weight 40 on the lever arm is once adjusted for any particular building and for the desired room temperature, that the regulator thereafter automatically controls the quantity of air supplied and maintains a constant room temperature.

If in extreme cold weather one desires to air a room and thereafter to heat it quickly it is only necessary to close the damper 32, as a result of which the incoming air is not tempered by the room air and hence, the pressure of the expansible fluid is rapidly diminished. As a consequence, the damper 42 is quickly opened and as soon as the room temperature is brought to the desired amount the damper 32 may again be opened.

If desired, I may utilize a damper 8 that is positioned in the air supply conduit 7 that connects the room to be heated with the conduit 29, and I may provide thermostatically controlled means in the room to be heated for controlling the operation of the damper 8. Normally, the damper is held by gravity in the full open position so long as the room temperature is above a predetermined degree, but is adapted to be closed whenever the room temperature drops below such predetermined degree. The damper closing mechanism may comprise an electromagnet 5 that is controlled by a room thermostat 6.

In Fig. 2, I have shown the regulator, as applied either to a gas or oil fired furnace in which the fuel supply pipe is indicated at 50 as extending into the air supply conduit 14 and thence into the combustion chamber of the furnace. A valve 51 in the supply line is adapted to be operated simultaneously with the damper 42. Accordingly, I have shown the valve control lever 52 as being connected to the bellows control lever 37 by a link 53. In this arrangement the air for supporting combustion is supplied in the same manner as that indicated in Fig. 1.

In Fig. 3, I have shown my invention, as applied to a steam boiler in which the parts that correspond to the boiler in Fig. 1 are represented by the same numerals. The boiler has in addition, however, a water gauge 60 which is supplied with the usual steam cock 61 and water cock 62. The conduit 35 in this modification is directly connected to the water leg of the boiler at 63 and to the collapsible bellows 36 at 64. The bellows, therefore, is operated by the pressure, which is exerted upon the water, instead of by an expansible fluid, but nevertheless the operation is the same insofar as concerns the responsiveness to changes in pressure within the boiler. The movement of the bellows is translated to movement of the air damper by a mechanism which is similar to that illustrated in Fig. 2 and in which the same parts bear the same corresponding numbers.

While I have described my invention in connection with my hot water boiler, it is evident that the same invention may be equally adapted in connection with a hot air furnace, such as is illustrated in Fig. 2, in which case, the coil 27 is positioned within the bonnet of the heating chamber, and in such case, the heated air is to be regarded as the "heating medium" as used within the means of this application.

In this application the term "outside air" means air that is taken from a point outside the building in which the furnace is located, while the term "inside air" means air that is conducted to the furnace from the furnace room, and "return air" means air that is conducted to the furnace from the heated rooms.

I claim:

1. In combination, a furnace, a heat conveying medium heated thereby, a conduit leading from the furnace for supplying outside air to support combustion within the furnace, a damper within the conduit, means for forcing a current of outside air under pressure into the conduit, said means operating to hold the damper partially open at all times, and means responsive to changes in temperature of the outside air and also of the heating medium for operating the damper.

2. In combination, a steam boiler, a conduit leading thereto for supplying air to support combustion therein, a damper in the conduit, means for supplying air under pressure to the conduit, said means operating to hold the damper partially open at all times, and means connected to the boiler below the normal water level thereof and responsive to changes in the boiler pressure for controlling the flow of air admitted to the furnace.

3. In combination, a steam boiler, an air supply conduit, a blower for forcing air through the conduit to support combustion within the furnace, a damper within the conduit, said blower operating to hold the damper partially open at all times, an expansible bellows, a conduit connecting the bellows to the boiler below the normal level of the water therein, and mechanism operatively connecting the bellows to the damper so as to move the damper in accordance with the movement of the bellows.

4. In combination, a furnace, a conduit for conducting outside air to the furnace to support combustion therein, a branch conduit connecting said conduit with the room to be heated for intermingling outside and return air, a damper in the branch conduit, a thermostat in the room to be heated for operating the damper, and a second thermostat in heat exchange relationship with the intermingled return and outside air for controlling the volume of intermingled air admitted to the furnace.

5. In combination, a furnace, a conduit for conducting outside air to the furnace to support combustion therein, a branch conduit leading to the room to be heated for intermingling outside and return air, a damper in the branch conduit, a thermostat in the room to be heated, electromagnetic means controlled by the thermostat for operating the damper, and a second thermostat in heat exchange relationship with the intermingled return and outside air for controlling the volume of intermingled air admitted to the furnace.

6. In combination, a furnace adapted for heating a room, a blower which operates continuously at constant speed, conduit means for conducting outside air through the blower and into the furnace to support combustion therein, and for conducting air to the blower from such room, a damper within the conduit means, the damper being adapted to be moved to and held in open position at all times by the pressure of air from the blower, and means controlled by the temperature of outside air received in the conduit means and of air conducted from such room for opposing the opening movement of the damper, whereby the position of the damper is automatically controlled in a manner tending to maintain substantially constant temperature in the room to be heated.

7. In combination, a furnace adapted for heating a room, a blower which operates continuously at constant speed for supplying air to support combustion in the furnace, conduit means for conducting outside air and air from such room to the furnace, and means responsive to the temperature of outside air as well as air from such room as conducted by said conduit means for automatically controlling the rate of air supply to the furnace, so as to maintain a substantially uniform temperature in the room to be heated.

8. In combination, a furnace, a blower which operates continuously at constant speed for supplying air to the furnace so as to support combustion therein, a conduit connected to the blower for conducting outside air to the furnace, and a device which acts to control the volume of air supplied to the furnace by said blower, said device having thermostatic means in heat-exchange relationship to a heated part of the furnace and also in heat-exchange relationship to the conduit, said means being adapted and arranged so that the device is responsive to changes in the temperature of the heating medium of the furnace and of outside air flowing through the conduit.

9. In combination, a furnace having a water boiler, a continuously operating blower for supplying air to the furnace so as to support combustion therein, a heating-fluid conduit leading from the boiler, a conduit for conducting outside air to the blower, a conduit for an expansible fluid having a portion thereof in sufficiently close proximity to each aforesaid conduit to be influenced by the temperature thereof, and a device responsive to temperature changes of the expansible fluid for controlling the volume of air admitted to the furnace, said device including a damper that acts to restrict air fed to the furnace by the blower and is movable under the influence of said device.

10. In combination, a furnace, an air conduit leading thereto, a blower for forcing air through the conduit and into the furnace, said conduit having two inlet openings therein, one for outside air and one for inside air, a damper associated with the latter inlet, said damper having means controlling it for maintaining said damper in closed position when outside air alone is flowing into the furnace and for opening the damper to admit inside air as the supply of outside air is increased beyond a predetermined rate.

11. A method of supplying air to a furnace so as to support combustion therein, comprising maintaining a continuous flow of outside air to the furnace, tempering the outside air by the addition of inside air and utilizing thermostatically controlled means which is influenced conjointly by the temperature of the incoming air and the temperature of the heating medium for automatically varying the amount of inside air in proportion to the volume of outside air that is admitted to the furnace.

JAMES C. MILES.